United States Patent Office 2,769,412
Patented Nov. 6, 1956

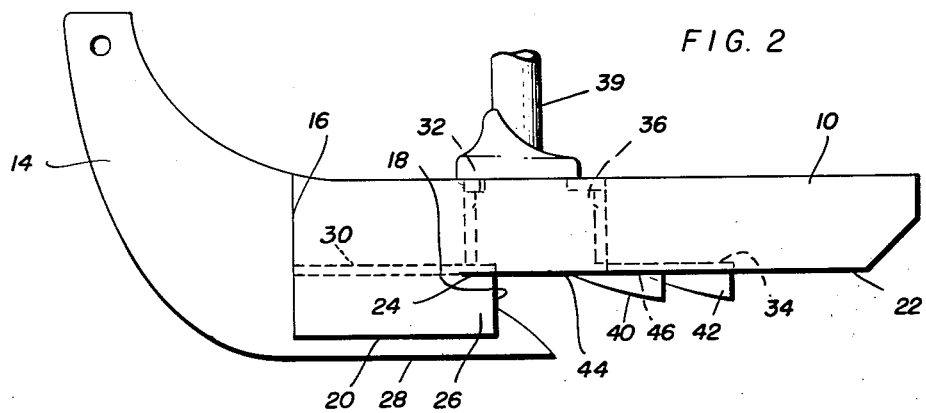
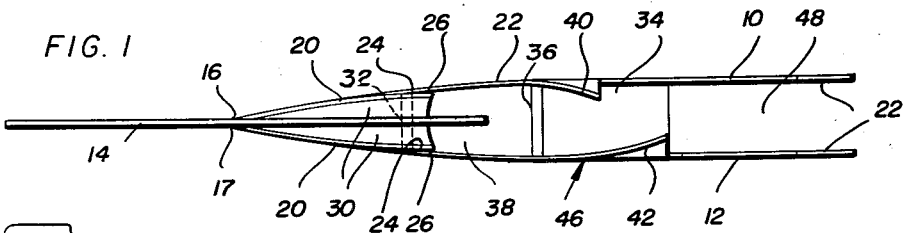
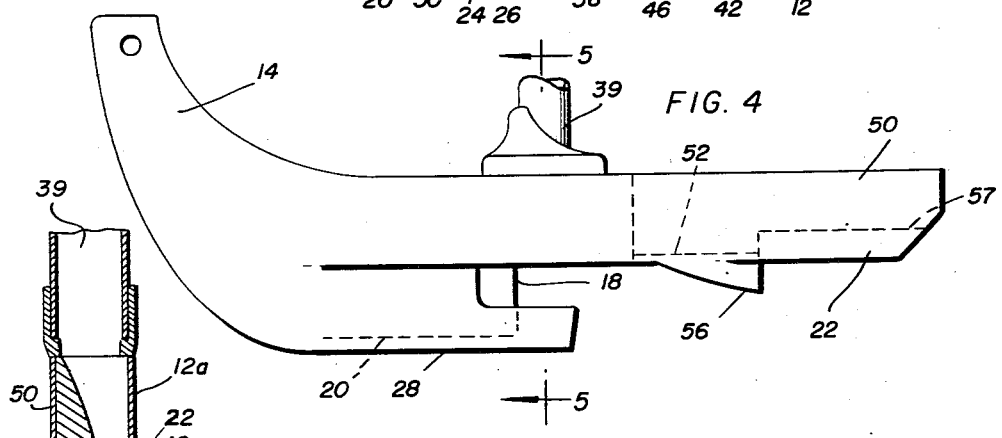
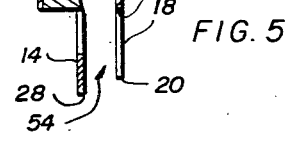
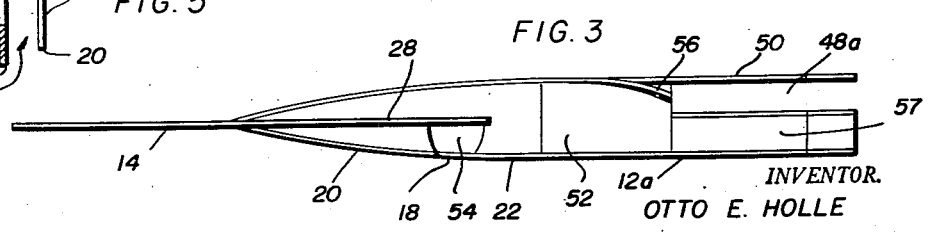

2,769,412

PLANTER SHOE

Otto E. Holle, Fort Wayne, Ind.

Application January 16, 1953, Serial No. 331,595

7 Claims. (Cl. 111—73)

The present invention relates to planter shoes, and more particularly to a shoe arrangement for depositing fertilizer and seed in a particular predetermined relationship.

In the planting of seed, it is usually desirable to combine the operations of fertilizing and sowing into one thereby saving much time and effort in performing the planting work. It has been definitely established by persons skilled in the art, that the fertilizers of usual composition must be deposited in a certain predetermined relationship with respect to the seed, but it has been found that only one particular relationship exists for all territorial soil areas.

In the use of the most common fertilizers containing nitrogen, phosphor and potash ingredients the nitrogen, when liberated from the fertilizer by contact with moisture, migrates upwardly, the phosphor ingredient tends to maintain its level of deposition, and the potash tends to leach downwardly; thus it becomes readily apparent, that the fertilizer may be deposited in a most advantageous position with respect to the planted seed germs. One preferred method is to deposit the fertilizer in the bottom of a furrow, covering the fertilizer with a thin coating of soil, then dropping the seed germs onto the soil covering. Another preferred method is to deposit the fertilizer to one side of the furrow, cover the fertilizer with a thin layer of soil, then drop the seed germs in the center of the furrow whereby the fertilizer is disposed laterally downwardly from the seed germs.

It is also well established that common fertilizers do not render the intended function until moisture has come into contact therewith. Since more moisture is normally contained in lower soil strata, deposition of the fertilizer on the bottom of a cut furrow will serve to take advantage of the moisture content of the relatively deep strata. With a soil covering separating the fertilizer from the seed germs, "burning" action by the fertilizer on the seed is prevented. As the fertilizer begins to work, the nitrogen liberates upwardly around the seed, and as the seed germinates, the roots reach downwardly into the fertilized regions which provide the stimulating nourishment.

The object of the present invention is to provide a planter shoe with suitable structure by means of which fertilizer may be deposited below the seed and separated from the seed by a thin covering of soil.

Another object of this invention is to provide a planter shoe which will first deposit the fertilizer, then cover the fertilizer within a thin coating of soil, then plant the seed on top of the soil coating, the planter shoe performing those functions without the use of any revolving or movable part.

It is another object of this invention to provide a planter shoe whereby the fertilizer may be deposited in the furrow in a position offset laterally from the planted seed.

Other objects and advantages will become apparent as the description proceeds.

To the accomplishment of the above and related objects, my invention may be embodied in the forms illustrated in the accompanying drawing, attention being called to the fact, however, that the drawings are illustrative only, and that specific changes may be made in the specific constructions illustrated and described, so long as the scope of the appended claims is not violated.

In the drawings:

Fig. 1 is a bottom plan view of one embodiment of this invention with parts omitted;

Fig. 2 is a side elevation of the same embodiment;

Fig. 3 is a bottom plan view of another embodiment of this invention with parts omitted;

Fig. 4 is a side elevation of the embodiment of Fig. 3; and

Fig. 5 is a fragmental section taken substantially on section line 5—5 of Fig. 4.

In particular, the present invention constitutes an improvement over the construtcion of the Holle Patent No. 2,164,066, granted on June 27, 1939. With reference to the drawings, and more particularly to Figs. 1 and 2, a planter shoe of this invention is comprised of a plurality of metallic plates secured together preferably by welding. Two spaced longitudinally extending parallel plates 10 and 12 are converged at the forward ends thereof onto a central runner plate 14, the forward ends of these side plates 10 and 12 being welded along opposite sides, respectively, of the plate 14 at 16 and 17 respectively. The sides 10 and 12 are substantially identical in shape, the forward ends thereof being stepped to provide a vertical edge as at 18 to provide lower and upper bottom edges 20 and 22.

Each side is slitted at 24 a short distance ahead of the step 18 along the line coextensive with the bottom edge 22, and the material below this slit 24 is formed inwardly to provide a furrow wall-forming surface 26 which lies in a plane generally parallel to but inwardly offset from the straight portion of the respective side plates 10, 12. The surfaces 26 are preferably formed generally parallel to each other and have such lengths as will become apparent from the following description.

As is seen more clearly in Fig. 2, the front end of the runner 14 is curved upwardly and the bottom edge 28 is disposed to extend rearwardly a short distance past the trailing edge 18 of the surface 26 and to depend below and parallel to the bottom edges 20. Any suitable means may be employed to secure the runner 14 centrally in place between the two side plates 10 and 12, and in the present instance, a suitably shaped plate 30 is used for this purpose. This plate 30 is preferably welded to the sides 10 and 12 and the runner 14, and extends rearwardly to a point flush with the trailing edges 18 of the furrow-forming surfaces 26. An upright passage-forming wall 32, shown more clearly in Fig. 2, is secured transversely to the two sides 10 and 12 and extends upwardly to the top edges of the sides from adjacent the trailing edges 18.

Another plate 34 similar to the plate 30 extends in a horizontal plane, in Fig. 2, between the sides 10 and 12, at a location spaced rearwardly some distance from the passage-forming wall 32. Another wall 36 like the wall 32 extends between the plates 10 and 12 adjacent the forward end of the plate 34 thereby forming an opening between the sides 10 and 12, which is generally indicated by the reference numeral 38. This opening 38 serves as an exit for descending fertilizer fed to the input tube 39 from suitable supply mechanism, such fertilizer being discharged adjacent the trailing edges 18 for a purpose which will be explained hereinafter.

Two deflecting plates 40 and 42 are suitably secured to the bottom edges 22 of the sides 10 and 12, respectively, and in the preferred arrangement, these blades are also secured by welding to the bottom surface of the plate 34. As seen in Fig. 2, these blades 40 and 42 are inclined downwardly and toward the rear of the shoe, and as seen in Fig. 1, these blades are curved inwardly and staggered fore and aft of the shoe for a purpose which will be explained more fully in the following description.

It is important to note that the leading, originating portions of the blades 40 and 42 indicated as being at 44 and 46, respectively, lie in the planes of the respective sides 10 and 12, and as a consequence, are positioned in planes laterally outside of the respective furrow-forming surfaces 26.

If a line is drawn coextensively from one of the surfaces 26 toward the rear of the shoe, it will be found to intercept the respective blade 40, 42 at a point intermediate the latter's ends. The importance of this feature will be explained more fully hereafter.

The space 48 between the side plates 10 and 12 and to the rear of the floor plate 34 is left open, and constitutes an outlet for the descending flow of seed therethrough. Thus, with suitable supply channels secured to or suitably feeding the two passages 38 and 48 respectively, fertilizer may be guided through the opening 38 and seed may be directed through the passage 48.

In use, the planter shoe of the foregoing description is mounted in a conventional manner on a suitable planting implement or vehicle which carries separate supplies of fertilizer and seed. The shoe is so mounted on the vehicle that as the latter advances, the leading portion of the runner 14 and the tapered configuration of the sides 10 and 12 will form a furrow having a width which is determined by the furrow-forming surfaces 26. Generally, the furrow will have a depth corresponding to the length of the trailing edge 18; and the bottom shoe edge 22 will tend to ride along on top of the ground laterally outside of the furrow wall formed by the surfaces 26. As the shoe continues to move forwardly, the blades 40 and 42 deflect small portions of the two furrow walls inwardly. As explained previously, the blades 40 and 42 are staggered fore and aft the shoe; and this is done to prevent clogging between the blades which would occur if they were laterally opposite each other. This staggered relation of the two blades is an important feature of this invention since it conduces to the end result of providing proper operation without the use of any moving parts.

In a continuous planting process, fertilizer flows through the passage 38 in a continuous stream from which it is deposited upon the floor of the furrow. The deflecting blades 40 and 42, because of the inclined bottom edge, cut into the soil and throw it inwardly over the fertilizer, after which seed emanating from the passageway 48 drops upon the soil covering thereby completing the planting operation.

Referring to Figs. 3 to 5, a second embodiment of this some invention is shown in which like parts will be assigned the same reference numerals. Here, two sides 50 and 12a secured at their forward ends to the opposite sides of runner 14 are cut to different shapes, the side 12a being substantially identical to the side 12 of Figs. 1 and 2, with the exception of the inset surface 26, and the side 50 being a flat plate of uniform width all along its length.

A suitable floor plate 52 is provided between the two plates 12a and 50 and suitable partitions provide a fertilizing feeding passageway 54 which opens adjacent the trailing edge 18 but which is spaced from the plate 50 but situated adjacent the plate 12a. Fertilizer flowing through this passage 54 will thereby be deposited along one lateral edge of the furrow formed by the shoe.

A soil deflector 56 depends from the bottom edge of the plate 50 and is constructed substantially identical to the blades 40 and 42 of Figs. 1 and 2. To the rear of the floor plate 52 a downwardly inclined seed-deflecting plate 57 is secured to side 12a thereby defining a seed outlet 48a disposed on the opposite lateral side of the shoe from the fertilizer outlet 54. In the operation of this shoe, fertilizer deposited to one side of the furrow floor by reason of the offset position of the passage 54 will be covered with a coating of soil by the deflecting action of the blade 56, and the seed guided through the rear passage 48a will generally be deposited along the other furrow sides.

In using the second described embodiment of this invention, the fertilizer and seed will be deposited in the furrow along parallel lines thereby satisfying some fertilizing requirements of certain types of soil and soil conditions.

From the foregoing, it will be seen that a planter shoe has been provided which has no revolving or moving parts for effecting the desired distribution of the fertilizer and seed, respectively, and which is therefore not susceptible to the usual damage and service wear which normally attends the use of such revolving and moving parts.

Preferably, the bottom edge of the runner 14 is formed blunt so that it will ride over tough roots and weeds without cutting into them and causing them to cling to the shoe thereby impairing the operation thereof. Clogging is further prevented by the fact that the two deflecting blades 40 and 42 which provide the soil coating over the deposited fertilizer, are separated longitudinally of the shoe so that no obstruction can be collected between the blades, to avoid dirt compacting and forming a clog therebetween.

If desired, the seed-deflecting plate 57 may be eliminated thereby allowing random deposition of the seed along the fertilizer soil-covering.

What is claimed is:

1. A planter shoe comprising an elongated structure having front and rear ends and vertically parallel longitudinally extending sides, a forwardly projecting runner plate secured between said sides and extending rearwardly a distance short of said rear end, said sides converging forwardly inwardly and secured to opposite sides respectively of said runner plate whereby the sides will have a tapered configuration in transverse longitudinal section, said sides having upper and lower bottom edges, the lower bottom edges being disposed forwardly of the upper bottom edges, the forward portion of the shoe which includes said lower bottom edges providing a furrow-forming portion having vertically arranged outer surfaces offset inwardly from the respective sides, two depending deflecting blades provided on said upper bottom edges of said sides respectively, said blades being staggered forwardly and rearwardly and angling rearwardly inwardly and downwardly into the path of the furrow wall formed in the soil by said furrow-forming portion, a fertilizer feeding passage between said sides and opening downwardly ahead of said deflecting blades for depositing fertilizer on the bottom of the furrow, said blades serving to throw soil over the deposited fertilizer as the shoe is moved forwardly, and a seed directing passage provided between said sides for depositing seed on the soil covering the fertilizer.

2. A planter shoe comprising an elongated structure having front and rear ends and vertically parallel longitudinally extending sides, a forwardly projecting runner plate secured between said sides and extending rearwardly a distance short of said rear end, said sides converging forwardly inwardly and secured to opposite sides respectively of said runner plate whereby the sides will have a tapered configuration in transverse longitudinal section, said sides having upper and lower bottom edges, the lower bottom edges being disposed forwardly of the upper bottom edges, the forward portion of the shoe which includes said lower bottom edges providing a furrow-forming portion having vertically arranged outer surfaces offset inwardly from the respective sides, two depending deflecting blades provided on the upper bottom edges of said sides respectively, said blades being staggered forwardly and rearwardly and angling rearwardly inwardly and downwardly into the path of the furrow wall formed in the soil by said furrow-forming portion, and a fertilizer feeding passage between said sides and opening downwardly ahead of said deflecting blades for depositing fertilizer on the bottom of the furrow, said blades serving to throw soil over the deposited fertilizer as the shoe is moved forwardly.

3. A planter shoe comprising an elongated structure having front and rear ends and vertically parallel longitudinally extending sides, said sides converging inwardly at the front ends thereof to provide a furrow-forming portion, said sides having upper and lower bottom edges, said lower bottom edges being on said furrow-forming portion, said furrow-forming portion having vertically arranged outer surfaces offset inwardly from the respective sides, two depending deflecting blades provided on the upper bottom edges of said sides respectively, said blades being staggered forwardly and rearwardly and angling rearwardly inwardly and downwardly into the path of the furrow wall formed in the soil by said furrow-forming portion, a fertilizer feeding passage between said sides and opening downwardly ahead of said deflecting blades for depositing fertilizer on the bottom of the furrow, said blades serving to throw soil over the deposited fertilizer as the shoe is moved forwardly.

4. A planter shoe comprising an elongated structure having front and rear ends and vertically parallel longitudinally extending sides, said sides converging inwardly at the front ends thereof to provide a furrow-forming portion, said sides extending rearwardly in parallel relation, the furrow-forming portion of said sides being bent inwardly to provide vertically disposed parallel surfaces which are offset inwardly from the planes of the respective sides so as to provide a furrow in the soil having a width dimension less than the spacing between said sides, depending deflector blades on said sides rearwardly of the furrow-forming portion which angle downwardly rearwardly and which converge inwardly from the respective sides whereby said blades will cut into the walls of the furrow and deflect soil inwardly as the shoe is moved forwardly, said blades also being staggered fore and aft to prevent the clogging of dirt therebetween, a fertilizer feeding passage between said sides and opening downwardly ahead of said blades for depositing fertilizer on the bottom of the furrow, said blades serving to throw soil over the deposited fertilizer as the shoe is moved forwardly, and a seed directing passage provided between said sides for depositing seed on the soil covering the fertilizer.

5. A planter shoe comprising an elongated structure having front and rear ends and vertically parallel longitudinally extending sides, said sides converging inwardly at the front ends thereof to provide a furrow-forming portion, said sides extending rearwardly in parallel relation, the sides which constitute said furrow-forming portion having vertically disposed parallel surfaces which are offset inwardly from the planes of the respective sides so as to provide a furrow in the soil having a width dimension less than the spacing between said sides, depending deflector blades on said sides rearwardly of the furrow-forming portion which angles downwardly rearwardly and which converge inwardly from the respective sides whereby said blades will cut into the walls of the furrow and deflect soil inwardly as the shoe is moved forwardly, said blades also being staggered fore and aft to prevent the clogging of dirt therebetween, and a fertilizer feeding passage between said sides and opening downwardly ahead of said blades for depositing fertilizer on the bottom of the furrow, said blades serving to throw soil over the deposited fertilizer as the shoe is moved forwardly.

6. A planter shoe comprising an elongated structure having front and rear ends and vertically parallel longitudinally extending sides, said sides converging inwardly at the front ends thereof, said sides extending rearwardly in parallel relation, furrow-forming surfaces depending from the converging portions of said sides respectively, said furrow-forming surfaces lying in vertically disposed parallel planes which are offset inwardly from the planes of the respective sides so as to provide a furrow in the soil having a width dimension less than the spacing between said sides, and depending deflector blades on said sides rearwardly of the furrow-forming surfaces which angle downwardly rearwardly and which converge inwardly from the respective sides whereby said blades will cut into the walls of the furrow and deflect soil inwardly as the shoe is moved forwardly, said blades also being staggered fore and aft to prevent the clogging of dirt therebetween.

7. A planter shoe comprising an elongated structure having front and rear ends and vertically parallel longitudinally extending sides, said sides converging inwardly at the front ends thereof, said sides extending rearwardly in parallel relation, furrow-forming surfaces depending from the converging portions of said sides respectively, said furrow-forming surfaces lying in vetically disposed parallel planes which are offset inwardly from the planes of the respective sides so as to provide a furrow in the soil having a width dimension less than the spacing between said sides, and depending deflector blades on said sides rearwardly of the furrow-forming surfaces which angle downwardly rearwardly and which converge inwardly from the respective sides whereby said blades will cut into the walls of the furrow and deflect soil inwardly as the shoe is moved forwardly.

References Cited in the file of this patent

UNITED STATES PATENTS

| | | |
|---|---|---|
| 557,046 | Bidwell | May 24, 1896 |
| 1,229,604 | Garst | June 12, 1917 |
| 2,159,652 | Brunner | May 23, 1939 |
| 2,623,483 | Stevenson | Dec. 30, 1952 |

FOREIGN PATENTS

| | | |
|---|---|---|
| 27,317 | Denmark | Mar. 14, 1921 |